United States Patent [19]

Vlas et al.

[11] Patent Number: 5,783,244
[45] Date of Patent: Jul. 21, 1998

[54] FLAVORING COMPOSITION CONTAINING GAMMA-JASMOLACTON

[75] Inventors: Anton Vlas, Naarden; Hans Julius Wille, Bussum, both of Netherlands

[73] Assignee: Unilever Patent Holdings B.V., Rotterdam, Netherlands

[21] Appl. No.: 12,801

[22] Filed: Feb. 2, 1993

Related U.S. Application Data

[63] Continuation of Ser. No. 740,516, Aug. 5, 1991, abandoned.

[30] Foreign Application Priority Data

Aug. 7, 1990 [EP] European Pat. Off. .............. 90202156

[51] Int. Cl.$^6$ ........................................................ A23L 1/22
[52] U.S. Cl. ............................................. 426/536; 426/534
[58] Field of Search ..................................... 426/536, 534

[56] References Cited

PUBLICATIONS

Furia et al, Feuaroli's Handbook of Flavor Ingredients, 2nd Ed., 1975, vol. I CRC Press: Cleveland, Ohio, pp. 379–380.

*Primary Examiner*—Leslie Wong
*Attorney, Agent, or Firm*—Pillsbury Madison & Sutro LLP

[57] ABSTRACT

The invention relates to flavoring compositions characterized by an effective amount of gamma-jasmolactone having the formula

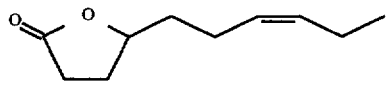

as well as the use of these flavorings or gamma-jasmolactone per se for imparting, enhancing or improving the flavor, in particular the fruity character of foodstuffs and drinks.

5 Claims, No Drawings

FLAVORING COMPOSITION CONTAINING GAMMA-JASMOLACTON

This is a continuation of application Ser. No. 07/740,516, filed on Aug. 5, 1991, now abandoned.

The invention relates a.o. to flavouring compositions containing gamma-jasmolactone.

The compound gamma-jasmolactone having the formula

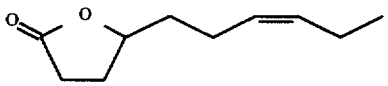

is known in perfumery. More in particular gamma-jasmolactone is known as one of the many components present in jasmin oil. For instance this lactone is mentioned in Agric. Biol. Chem. 45 (11), pages 2639–2640 (1981). As disclosed therein the compounds jasmone, methyl jasmonate and gamma-jasmolactone termed jasmonoids are considered the main odorous principles in the essential oil of jasmin flowers (jasmin oil). In this reference the odorous or perfume properties of these jasmonoids are merely briefly mentioned as this reference is directed to a new synthesis of gamma-jasmo-lactone.

In Yukagaku 32 (1983) 2, pages 82–87 it is indicated in the "Introduction" that the three compounds cis-jasmone, methyl jasmonate and gamma-jasmolactone isolated from jasmin oil, are valuable compounds as jasmin perfumes. However, the essence of this last mentioned reference was lain in the fact that these compounds could be prepared on the basis of 1-(p-tolylsulfonyl)-cis-3-hexene as starting compound.

Furthermore, in Derwent Abstract D23 90-110482/15 it is reported that gamma-jasmolactone, prepared from 1-cyano-3-hydroxy-cis-6-nonene and lactonisation is useful as perfume.

Summarizing the above cited references it is stated that gamma-jasmolactone is known as an important and major odorous component of jasmin oil and—on account of that property—is used for perfume applications. Any indication or suggestion for using gamma-jasmolactone in flavouring compositions to be used for the flavoring of foodstuffs etc. is missing in these references.

Further from Agric. Biol. Chem. 44 (7), pages 1535–1543 (1980) it is known that besides the eight major constituents of peppermint oil, i.e. menthol, menthone, 1,8-cineole, menthyl acetate, isomenthone, pulegone, piperitone and 3-octanol, about 300 other components are present therein as minor and trace volatile components. One of these trace components is gamma-jasmolactone present in a content of about 0.0001 wt. %. On page 1539, right column of this last mentioned reference it is reported that cis- and trans-Rose oxide as well as gamma- and delta-jasmin lactone impart a rosy and jasmin-like note to the odour of this (peppermint) oil.

Finally in British patent 743,845 a process of preparing oleagineous foodstuffs, in particular margarine, shortening, cooking oil etc. is disclosed according to which a small quantity of a lactone of an aliphatic gamma-hydroxy carboxylic acid having 4–14 carbon atoms is incorporated in the oleaginous foodstuff in question. In essence the oleaginous foodstuffs are mixed with lactones of saturated gamma-hydroxy carboxylic acids having preferably 8–12 carbon atoms. Specific representatives of such lactones which are usable in practice and illustrated in the specification of said patent are the lactones of the following saturated fatty acids: gamma-hydroxy butyric acid, gamma-hydroxy octanoic acid, gamma-hydroxy nonanoic acid, gamma-hydroxy decanoic acid, gamma-hydroxy undecanoic acid and gamma-hydroxy dodecanoic acid.

Surprisingly it has been found that the unsaturated lactone gamma-jasmolactone is particularly suitable for use as a flavoring compound per se or as an ingredient in flavoring compositions, especially suitable for imparting, enhancing or improving the fruity character of foodstuffs and drinks.

According to Applicant the organoleptic description of gamma-jasmolactone is fruity, flowery, green, creamy, sweet, juicy and has an association with peaches and tropical fruits.

Therefore the invention relates to the use of gamma-jasmo-lactone per se or in the form of an ingredient of a flavoring composition for imparting, enhancing or improving the fruity character of foodstuffs etc.. Examples of foodstuffs which may be flavored in accordance with the present invention are a) fruit beverages;

b) confectionery like sweets and candy;

c) food products, which ought to have a fruity character;

d) tooth cleansing products like toothpaste etc.;

e) tobacco products; and f) pharmaceutical products.

As indicated above gamma-jasmolactone may be incorporated in flavoring compositions containing a number of other flavoring compounds. Flavoring compounds which may be used with the gamma-jasmolactone are well known in the art and are mentioned in e.g. S.Arctander, Perfume and Flavor Materials of Natural Origin (Elisabeth, N.J., USA, 1969), in T. E. Furia et al., CRC Fenaroli's Handbook of Flavor Ingredients, 2nd Ed. (Cleveland, CRC Press Inc., 1975) and in H. B. Heath, Source Book of Flavors (The Avi Publishing Company Inc., Westport, Conn., 1981).

The amount of gamma-jasmolactone that can be used in a flavoring composition or in a flavored product can be varied within broad limits and depends e.g. on the product wherein the flavoring is incorporated, the nature and the amount of the other components of the flavoring composition and the effect desired. Therefore it is only possible to indicate very broad limits which, however, provide an expert with sufficient information to be able to use gamma-jasmolactone, independently. In most cases an amount of only 0.1% by weight in a flavoring composition is sufficient to obtain a clearly observable effect. Normally an amount in the range of 0.01–10% by weight of gamma-jasmolactone will be used in flavoring compositions.

In products flavored with flavoring compositions according to the invention or with gamma-jasmolactone per se its concentration is proportionally lower and depends on the quantity of the composition or compound used in the product.

Gamma-jasmolactone can be prepared in a way known from the art. An example of the synthesis of gamma-jasmolacton is described in Helvetica Chimica Acta, 61, Fasc. 3 (1978) Nr. 87, pages 990–997, using a multi-stage synthesis with acrolein and a Grignard reagent prepared from Mg and 1-bromohex-3-ene as starting reagens.

Another synthesis of gamma-jasmolactone is disclosed in J. Org. Chem. 45, pages 237–240 (1980) using a multi-stage synthesis with gamma-(trimethylsiloxy)butyronitrile and a Grignard reagent prepared from Mg and 1-bromohex-3-ene as starting reagens (see Scheme II in said reference).

Further preparation methods are disclosed in Yukagaku 36 (1987), 5, pages 362–365, according to which gamma-jasmolactone is prepared from 1,1-diethoxy-cis-7-decen-4- ol by Jones oxidation in 88% yield and in Yukagaku 37 (1988), 1, pages 19–22, according to which gamma-jasmolactone is prepared from methyl 6-formyl-4-oxo-hexanoate.

The use of gamma-jasmolactone in for instance fruity flavorings is illustrated by the following examples but is not limited thereto in any way; the gamma-jasmolactone used in these examples had been prepared according to the so-called Stetter-reaction illustrated below:

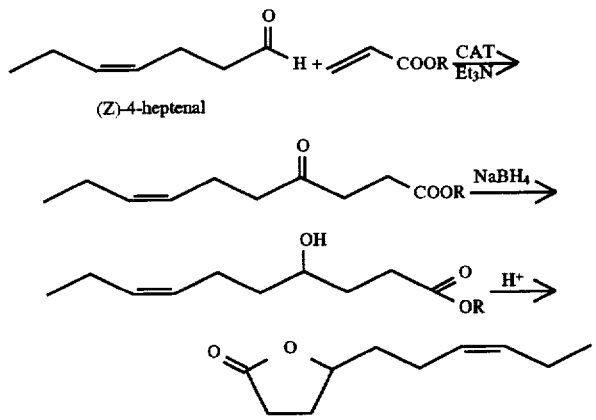

EXAMPLE I

Apricot flavorings were prepared according to the following recipes

|  | A (parts by weight) | B (parts by weight) | C (parts by weight) |
| --- | --- | --- | --- |
| Linalylacetate | 0.2 | 0.2 | 0.2 |
| Boronia absolute | 0.5 | 0.5 | 0.5 |
| Osmanthus absolute | 0.5 | 0.5 | 0.5 |
| Genet absolute | 1.0 | 1.0 | 1.0 |
| Linalool | 3.0 | 3.0 | 3.0 |
| Benzaldehyde | 5.0 | 5.0 | 5.0 |
| Ethylhexanoate | 5.0 | 5.0 | 5.0 |
| Ethylacetate | 22.0 | 22.0 | 22.0 |
| Amylacetate | 44.5 | 44.5 | 44.5 |
| Amylhexanoate | 7.0 | 7.0 | 7.0 |
| Decalactone, gamma | 10.0 | — | — |
| Jasmolactone, gamma | — | 10.0 | — |
| Damascenon 0.1% solution* | 10.0 | 10.0 | 10.0 |
| Propylene glycol | 891.3 | 891.3 | 901.3 |
|  | 1000 | 1000 | 1000 |

*0.1% solution in ethanol.

EXAMPLE II

Peach flavorings were prepared according to the following recipes

|  | A (parts by weight) | B (parts by weight) | C (parts by weight) |
| --- | --- | --- | --- |
| Damascenon | 0.8 | 0.8 | 0.8 |
| Geraniol | 0.04 | 0.04 | 0.04 |
| Jonon α | 0.04 | 0.04 | 0.04 |
| Decanal | 0.15 | 0.15 | 0.15 |

-continued

|  | A (parts by weight) | B (parts by weight) | C (parts by weight) |
| --- | --- | --- | --- |
| Anethol | 0.3 | 0.3 | 0.3 |
| Jasmin absolute | 0.4 | 0.4 | 0.4 |
| Ethyl hexanoate | 0.4 | 0.4 | 0.4 |
| Lemon oil | 1.5 | 1.5 | 1.5 |
| Benzaldehyde | 0.6 | 0.6 | 0.6 |
| Linalylacetate | 1.0 | 1.0 | 1.0 |
| Ethylbutanoate | 1.0 | 1.0 | 1.0 |
| Butylacetate | 1.3 | 1.3 | 1.3 |
| Acetaldehyde | 0.3 | 0.3 | 0.3 |
| Dodecalacton, gamma | 2.3 | 2.3 | 2.3 |
| Linalool | 3.5 | 3.5 | 3.5 |
| Ethylacetate | 5.5 | 5.5 | 5.5 |
| Hexen-3-yl-1-acetate, cis | 6.8 | 6.8 | 6.8 |
| Hexen-3-ol-1, cis | 8.0 | 8.0 | 8.0 |
| Amylacetate | 10.0 | 10.0 | 10.0 |
| P-Menthanethiol-8-on 3 1% sol. ** | 3.0 | 3.0 | 3.0 |
| Decalactone, gamma | 20.0 | — | — |
| Jasmolactone, gamma | — | 20.0 | — |
| Propylene glycol | 933.07 | 933.07 | 953.07 |
|  | 1000 | 1000 | 1000 |

** 1% solution in ethanol.

EXAMPLE III

Strawberry flavorings were prepared according to the following recipes

|  | A (parts by weight) | B (parts by weight) | C (parts by weight) |
| --- | --- | --- | --- |
| Amylbutyrate | 2.0 | 2.0 | 2.0 |
| Ethyl hexanoate | 5.0 | 5.0 | 5.0 |
| Ethyl isovalerate | 6.0 | 6.0 | 6.0 |
| Hexeen-3-yl-acetate, cis | 3.0 | 3.0 | 3.0 |
| Methyl butyric acid-2 | 10.0 | 10.0 | 10.0 |
| Ethyl-2-methyl butanoate | 10.0 | 10.0 | 10.0 |
| Propionic acid | 10.0 | 10.0 | 10.0 |
| Nonadienal 2.6. | 0.4 | 0.4 | 0.4 |
| Hexeen-3-ol-1, cis | 7.0 | 7.0 | 7.0 |
| Ethylbutanoate | 21.0 | 21.0 | 21.0 |
| Decalactone, gamma | 10.0 | — | — |
| Jasmolactone, gamma | — | 10.0 | — |
| 2,5-dimethyl-4-hydroxyl-3-(2H)furanone 15%* | 660.0 | 660.0 | 660.0 |
| Maltol | 6.0 | 6.0 | 6.0 |
| Propylene glycol | 249.6 | 249.6 | 259.6 |
|  | 1000 | 1000 | 1000 |

*15% solution in ethanol.

In view of the above Examples I–III it is brought to the fore that flavorings C, containing no lactone, are evaluated as poor flavorings flavorings A, containing a known natural lactone, i.e. gamma-decalactone, are evaluated as moderate flavorings, whereas flavorings B, containing the gamma-jasmolactone according to the invention, are evaluated as very good flavorings.

More in particular gamma-jasmolactone imparts the desired typical, sweet velvety contribution to the flavoring base which aspect is missing in the flavorings A and C. The compound gamma-jasmolactone emphasizes the natural fruity character of the apricot, peach and strawberry flavorings illustrated in the above three examples and provides a completion of the flavor in question.

We claim:

1. A composition which comprises an ingestible food or beverage, and an effective amount of gamma-jasmolactone of the formula:

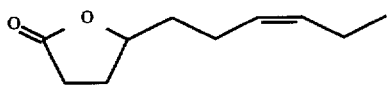

sufficient to impart a fruity flavor to said composition.

2. A composition according to claim 1 selected from the group consisting of fruit beverages, foods, toothpastes, tobacco and pharmaceuticals.

3. In a fruity flavoring composition, the improvement which comprises including from 0.1 to 10 wt. % of gamma-jasmolactone of the formula:

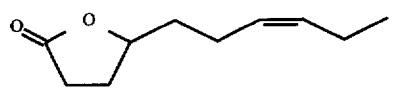

said composition to improve its fruity flavor.

4. The method of flavoring a composition which comprises adding to said composition an amount of gamma-jasmolactone of the formula:

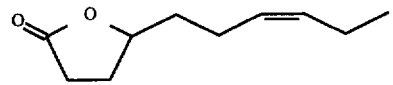

sufficient to impart a fruity flavor to said composition.

5. The method of claim 4 wherein the composition is a fruit beverage.

* * * * *